United States Patent

Bruzek

[11] 4,063,412
[45] Dec. 20, 1977

[54] PULLER TOOL

[75] Inventor: Daniel A. Bruzek, Medford, Minn.

[73] Assignee: Owatonna Tool Company, Owatonna, Minn.

[21] Appl. No.: 739,007

[22] Filed: Nov. 4, 1976

[51] Int. Cl.² ............................................. B21L 21/00
[52] U.S. Cl. ......................................................... 59/7
[58] Field of Search ..................... 59/7, 11; 72/453.01

[56] References Cited

U.S. PATENT DOCUMENTS

| 1,986,493 | 1/1935 | Abramson | 59/7 |
|---|---|---|---|
| 2,020,162 | 11/1935 | Rodgers | 59/7 |
| 2,940,497 | 6/1960 | Herrstrum | 72/453.01 |
| 3,058,295 | 10/1962 | Temple | 59/7 |
| 3,075,347 | 1/1963 | Bonifas | 59/7 |
| 3,172,250 | 3/1965 | Eastep | 59/7 |
| 3,553,960 | 1/1971 | Ellefson | 59/7 |

*Primary Examiner*—C.W. Lanham
*Assistant Examiner*—Gene P. Crosby
*Attorney, Agent, or Firm*—Wegner, Stellman, McCord, Wiles & Wood

[57] ABSTRACT

A portable puller tool for track end connectors having a base with a fluid cylinder therein for mounting a ram for extension outwardly of the base, an arm extended outwardly from the base to locate an end thereof at a distance from the base to engage an end connector and a pair of pusher members connected to the ram for engagement with a pair of track pad shafts whereby extension of the ram relative to the base causes the base and arm end to move away from the track and pull the track end connector off said track pad shafts.

4 Claims, 6 Drawing Figures

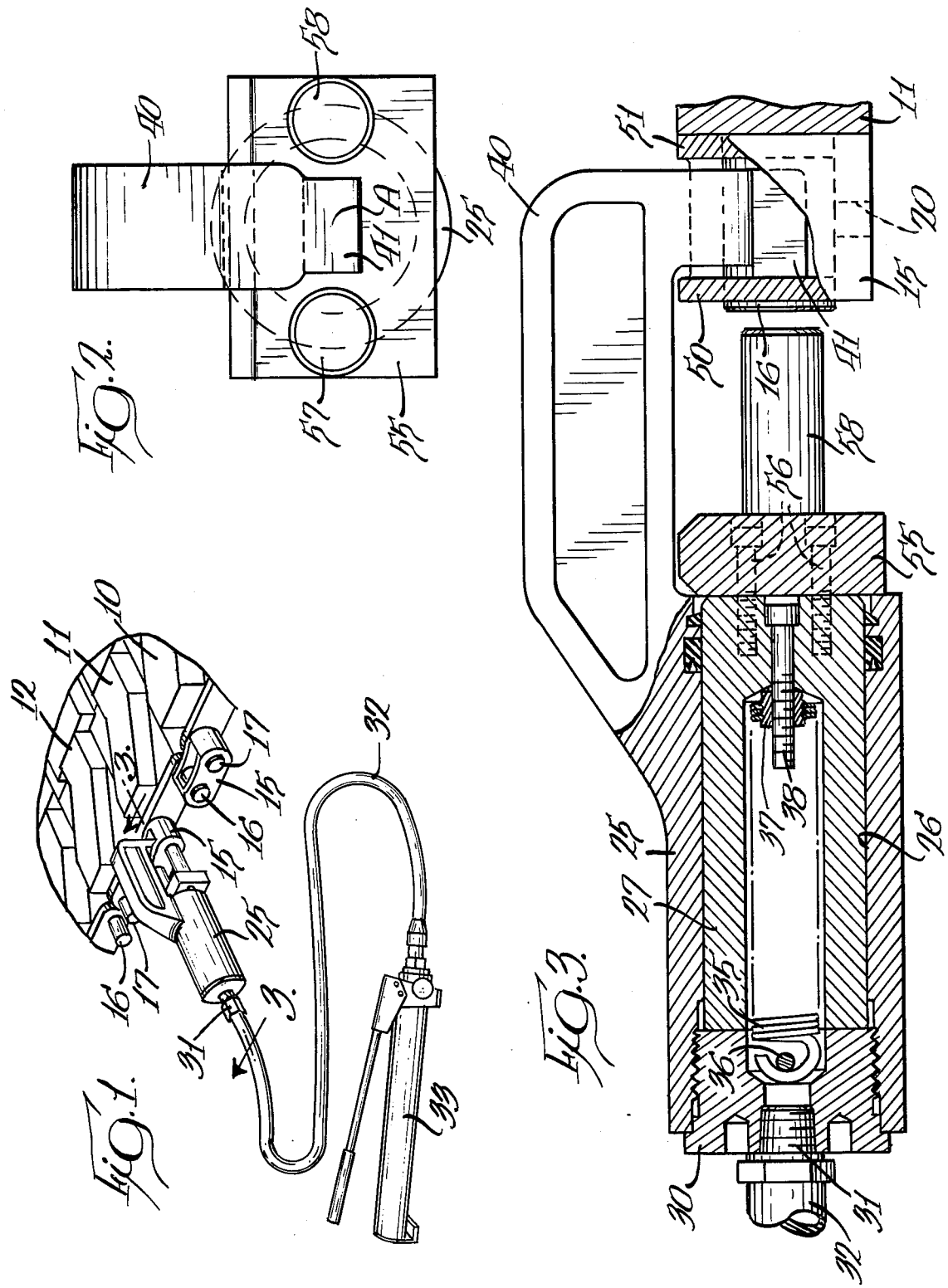

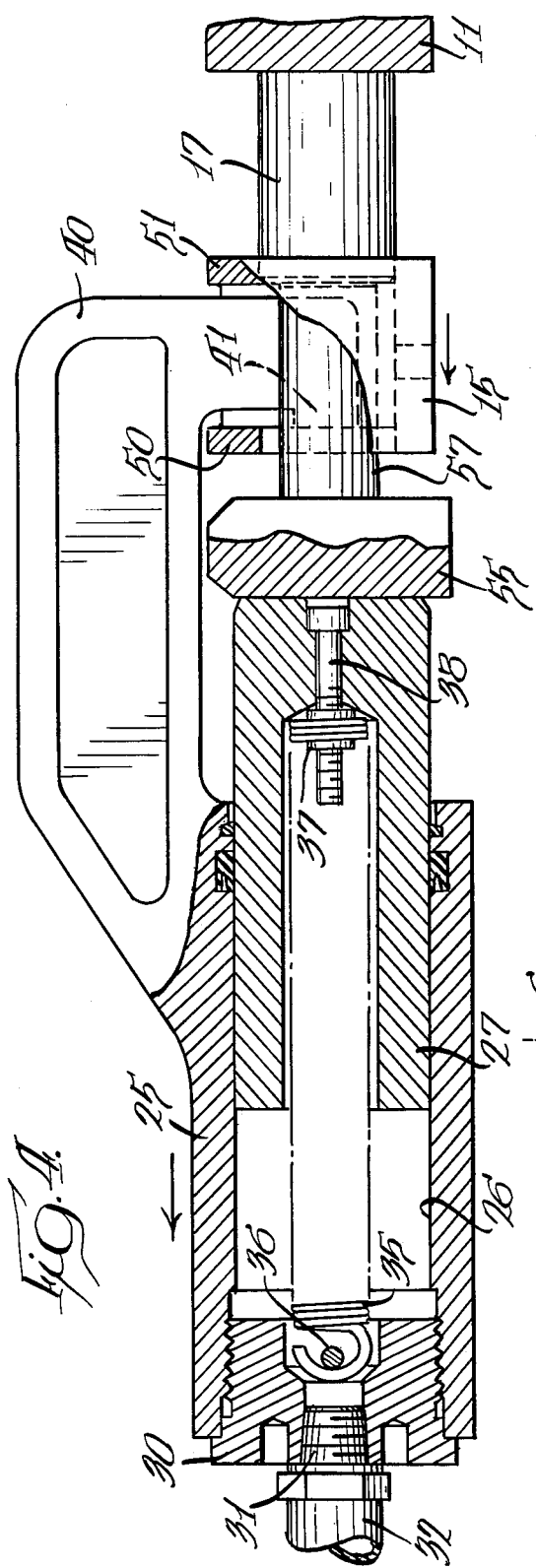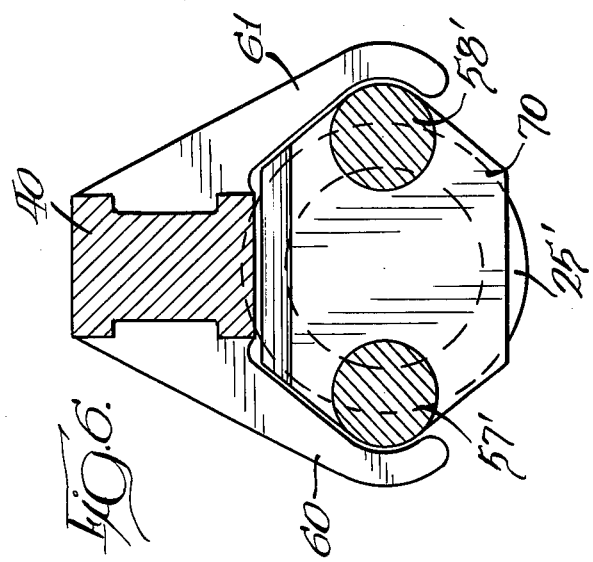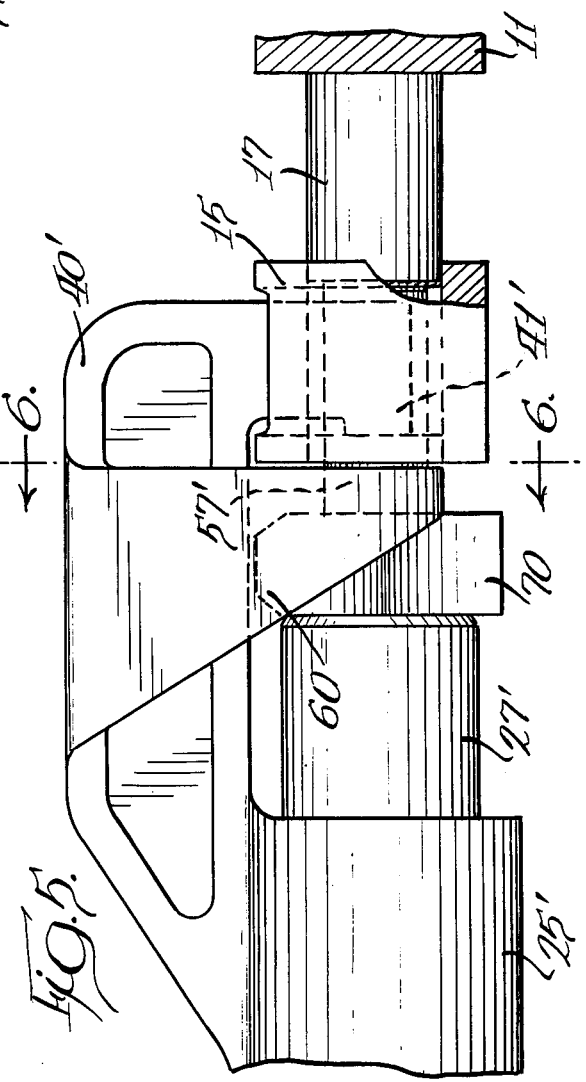

PULLER TOOL

BACKGROUND OF THE INVENTION

This invention pertains to a puller tool and, more particularly, to a fluid operated tool for pulling a track end connector off a pair of track pad shafts as used in military tank tracks.

A prior art device for pulling an end connector off a pair of track pad shafts has included a frame with an arm end engageable inside an end connector and a pair of threaded pusher members engageable one with each of a pair of track pad shafts whereby rotation of the pusher members advances the pusher members relative to the frame and the end connector is pulled off the track pad shafts. The prior art tool required substantial screw torque because th end connectors frequently become rusted or fretted to the track pad shafts and additionally an operator had to shift from one threaded pusher member to the other to alternately advance the pusher members in order to draw the end connector off the track pad shafts without binding thereof on the shafts. The assignee of this application manufactures many different types of pusher and puller tools including a portable tool for pushing track pins wherein a base which has a cylinder connected thereto fastens onto a part of a track and a pin pusher connected to a ram extendable from the cylinder pushes a pin relative to the track.

SUMMARY

A primary feature of the invention disclosed herein is to provide a puller tool wherein a track end connector may be simply removed from a pair of track pad shafts by engaging a part of the tool with the end connector and simultaneously pushing with substantial force on the ends of the pair of track pad shafts to draw the end connector off the shafts.

Another feature of the invention is to provide a tool as defined in the preceding paragraph which is portable and may be connected to a source of fluid, such as oil under pressure and has a base with means associated therewith for engaging behind the end connector. A ram is extendable from the base and carries a pair of pusher members which engage the track pad shafts whereby extension of the ram relative to the base causes the end connector engaging means to move outwardly relative to the track pad shafts and pull the end connector therefrom.

Another feature of the invention is to provide a puller tool, as defined in the preceding paragraphs, wherein an alternate embodiment has a pair of fingers associated with the end connector engaging means to provide an effective three-point contact of the end connector whereby the tool will effectively prevent cocking of the end connector on the track pad shafts during removal thereof.

BRIEF DESCRIPTION OF THE DRAWINGS

FIG. 1 is a perspective view of the portable puller tool shown in association with a fluid power source and a section of track, such as military tank track;

FIG. 2 is an end elevational view of the portable puller tool;

FIG. 3 is a vertical section of the tool, taken generally along the line 3—3 in FIG. 1 and showing a section of fluid line connected thereto and with the tool in association with the track;

FIG. 4 is a view, similar to FIG. 3, showing the tool positioned with the end connector almost completely removed from the track;

FIG. 5 is a fragmentary side elevational view of a modified form of the invention with the parts positioned similarly to the position of FIG. 4; and FIG. 6 is a vertical section, taken generally along the line 6—6 in FIG. 5.

DESCRIPTION OF THE EMBODIMENTS

A particular use for the puller tool disclosed herein is for removal of end connectors from tracks, particularly military tank tracks. Such a track structure is shown in FIG. 1 wherein a series of rubber pads 10, 11, and 12 are interconnected into an endless track by end connectors 15 which fit on and interconnect a pair of track pad shafts 16 and 17 which extend outwardly, one from each of adjacent track pads. When operatively related with the track pads, an end connector 15 has a separate split wedge member (not shown) which fits down into an internal opening of the end connector and which is held in position by a cap screw (not shown) which extends upwardly through an opening 20 in the bottom of the end connector (FIG. 3). In use of the track, the rubber pads flex and when it is necessary to replace a rubber pad it is necessary to remove two end connectors 15 from each side of the track.

The portable puller tool is shown in operative position in FIG. 1 and also in FIG. 3. The tool has a body with a base 25 which, as shown, is generally cylindrical and which has an open-ended fluid cylinder 26 formed therein to movably receive a ram 27 which may move outwardly from an end of the base 25. Suitable seals are provided to prevent fluid leakage. The opposite end of the cylinder 26 is closed by an end plug 30 which threads into the base 25 and has a fitting 31 for connection to a fluid hose 32 which extends to a source of power, such as a hydraulic hand pump 33. Supply of fluid under pressure, such as hydraulic oil, to the cylinder 26, causes outward extension of the ram 27 from the position shown in FIG. 3 and tensions a spring 35 fastened at one end to a member 36 carried by the end plug and generally positioned within a recess in the ram 27 and connected thereto by a fastener 37 threaded onto a bolt 38 secured to the ram.

Means connected to the base 25 for engaging an end connector includes a generally L-shaped arm 40 which is offset from the base for clearance and extends outwardly therefrom with an angled end 41 of the arm extending to a position to be aligned with the axis of movement of the ram 27 as identified at A in FIG. 2. The angled end 41 of the arm is shaped as shown in FIGS. 2 and 3 to be positionable between a pair of spaced plates 50 and 51 of an end connector and also between an adjacent pair of track pad shafts 16 and 17. The tool is positioned for removal of an end connector in FIGS. 1 and 3.

For actual removal of the end connector, fluid, such as oil, is delivered under pressure through the line 32 to the hydraulic cylinder 26 to cause extension of the ram 27. The exposed end of the ram has a mounting plate 55 secured thereto by threaded fasteners 56 and this mounting plate carries a pair of laterally spaced-apart pusher members 57 and 58 which are in alignment with a pair of track pad shafts 16 and 17. The pusher members 57 and 58 are at the same level as the axis A as shown in FIG. 2 and at the same level as the end 41 which engages with the end connector 15. Additionally, the pusher members 57 and 58 are equidistant from the axis A whereby the application of forces to the track pad shafts and to the end connector results in a substantially straight pull of the end connector off the track pad shafts.

Initial outward extension of the ram 27 moves the outer ends of the pusher members 57 and 58 into engagement with the exposed ends of the track pad shafts 16 and 17. Further extension of the ram relative to the base 25 of the tool results in relative movement, as illustrated in FIG. 4, wherein the ram and mounting plate 55 in effect remain stationary because of their abutment with the track pad shafts while the base 25 of the puller tool and the arm 40 move toward the left to have arm end 41 push against end connector plate 50 and pull the end connector 15 off the track pad shafts. With the parts positioned as shown in FIG. 4; the end connector 15 is effectively transferred from the track pad shafts onto the pusher members 57 and 58. The fluid pressure applied to the cylinder 26 may be relieved and the ram retracted by means of the spring 35 and the pusher members 57 and 58 effectively withdrawn from the end connector 15 whereby it falls free from the tool.

It is believed the operation of the puller tool will be evident from the foregoing description. Briefly, it may be noted that the tool is placed in position, as shown in FIGS. 1 and 3, after the locking wedge and cap screw have been removed from the end connector. Fluid under pressure is then delivered to the tool to extend the ram 27 to move the parts to the position shown in FIG. 4 to pull the end connector off of the track pad shafts. After this, pressure is removed from the tool which permits retraction of the ram and frees the end connector 15 for removal from the tool.

An alternate embodiment is shown in FIGS. 5 and 6 wherein the same parts as the embodiment of FIGS. 1–4 have been given the same reference numeral with a prime affixed thereto.

In this embodiment, a pair of fingers 60 and 61 extend downwardly from opposite sides of the L-shaped arm 40' to extend adjacent the outer face of the end connector plate 50 and to a side thereof opposite the side engaged by the arm end 41'. The fingers 60 and 61 assist in eliminating the possibility of an end connector 15 cocking as it is pulled off the track pad shafts 16 and 17. The mounting plate 70 for the pusher members is shaped as shown in FIG. 6 in order to avoid interference with the fingers 60 and 61 as these parts move relative to each other in the removal operation.

I claim:

1. A portable puller for a track end connector which is movably mounted on a pair of track pad shafts comprising, a base having a fluid cylinder therein which opens to an end of the base, a ram movably mounted in said cylinder for extension beyond said end of the base, means connected to said base for engaging inside an end connector at a distance from said base for holding an end connector fixed relative to said base, including a generally L-shaped arm offset from the base and extending outwardly from the base with an end aligned with the axis of said cylinder, and means connected to said ram for engaging said track pad shafts and simultaneously pushing on both said track pad shafts as the ram is extended to pull the end connector off said track pad shafts by relative movement between the ram and the base comprising a pair of pusher members positioned one to either side of said cylinder axis and engageable one with each of said track pad shafts.

2. A puller as defined in claim 1 wherein said arm has a pair of laterally spaced-apart depending fingers between said base and said arm end and said fingers being spaced apart a distance sufficient to permit movement of the pusher members therebetween.

3. A puller as defined in claim 1 wherein said base has means remote from said end to connect a fluid supply line thereto, and spring means connected between said base and ram for returning said ram after extension thereof.

4. A puller for track end connectors comprising, a body having a base with a fluid cylinder therein, a ram movable outwardly from an end of the base, an arm extended from said end of the base and having an end aligned with the axis of said cylinder, and a pair of pusher members operatively connected to said ram and positioned one to either side of said axis for movement toward said arm end as the ram moves out from said base, said arm having a pair of laterally spaced-apart depending fingers between said base and said arm end and said fingers being spaced apart a distance sufficient to permit movement of the pusher members therebetween.

* * * * *